US009294958B2

(12) United States Patent
Chakravarthy et al.

(10) Patent No.: US 9,294,958 B2
(45) Date of Patent: Mar. 22, 2016

(54) METHOD AND APPARATUS FOR DYNAMICALLY CONFIGURING A CELL UPDATE MESSAGE

(71) Applicant: QUALCOMM Incorporated, San Diego, CA (US)

(72) Inventors: Chetan Gopalakrishnan Chakravarthy, San Diego, CA (US); Sathish Krishnamoorthy, Hyderabad (IN); Madhavi Duvvuru, Hyderabad (IN); Ansah Ahmed Sheik, Hyderabad (IN); Liangchi Hsu, San Diego, CA (US); Yongsheng Shi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 123 days.

(21) Appl. No.: 13/908,710

(22) Filed: Jun. 3, 2013

(65) Prior Publication Data

US 2014/0022989 A1 Jan. 23, 2014

Related U.S. Application Data

(60) Provisional application No. 61/673,875, filed on Jul. 20, 2012.

(51) Int. Cl.
*H04W 28/06* (2009.01)
*H04W 60/02* (2009.01)

(52) U.S. Cl.
CPC .............. *H04W 28/06* (2013.01); *H04W 60/02* (2013.01)

(58) Field of Classification Search
USPC ........................................................ 370/328
See application file for complete search history.

(56) References Cited

U.S. PATENT DOCUMENTS

| 7,039,014 | B1 * | 5/2006 | Krishnamurthy et al. | 370/244 |
| 7,043,751 | B1 * | 5/2006 | Fischer et al. | 726/7 |
| RE40,148 | E * | 3/2008 | Burns et al. | 370/216 |
| 8,131,294 | B2 * | 3/2012 | DiGirolamo et al. | 455/435.2 |
| 8,498,212 | B2 * | 7/2013 | Lin et al. | 370/241 |

(Continued)

FOREIGN PATENT DOCUMENTS

| DE | EP2549817 B1 * | 1/2013 | H04W 72/04 |
| EP | 2549817 B1 * | 5/2014 | |

(Continued)

OTHER PUBLICATIONS

On the size limitation of the RACH signalling, Jan. 2011, Alcatel-Lucent, Alcatel-Lucent Shanghai Bell, R2-110103.*

(Continued)

*Primary Examiner* — Noel Beharry
*Assistant Examiner* — Wilfred Thomas
(74) *Attorney, Agent, or Firm* — Ashish L. Patel

(57) ABSTRACT

The present disclosure presents a method and apparatus for dynamically configuring a cell update message at a user equipment (UE). For example, the method may include determining that a size of the cell update message at the UE is above a threshold value after a "measured results on random access channel (RACH)" information element (IE) is excluded from the cell update message. Furthermore, such an example method may include removing one or more IEs from the cell update message until the size of the cell update message is at or below the threshold value. As such, dynamic configuration of a cell update message at a UE is achieved.

30 Claims, 9 Drawing Sheets

(56) References Cited

U.S. PATENT DOCUMENTS

| | | | |
|---|---|---|---|
| 8,675,692 B2* | 3/2014 | Park et al. | 370/522 |
| 8,744,508 B2* | 6/2014 | Chen | 455/517 |
| 8,780,744 B2* | 7/2014 | Song et al. | 370/252 |
| 8,792,432 B2* | 7/2014 | Martin et al. | 370/329 |
| 8,848,553 B2* | 9/2014 | Song et al. | 370/252 |
| 8,873,479 B2* | 10/2014 | Song et al. | 370/329 |
| 2002/0136227 A1* | 9/2002 | Laarhuis et al. | 370/408 |
| 2004/0015599 A1* | 1/2004 | Trinh et al. | 709/232 |
| 2005/0009527 A1* | 1/2005 | Sharma | 455/445 |
| 2005/0266846 A1* | 12/2005 | Kim | 455/436 |
| 2008/0287120 A1* | 11/2008 | Kuo | 455/425 |
| 2009/0061908 A1 | 3/2009 | Kuo | |
| 2009/0109912 A1* | 4/2009 | DiGirolamo et al. | 370/329 |
| 2009/0143074 A1 | 6/2009 | Pelletier et al. | |
| 2010/0014479 A1* | 1/2010 | Kim | 370/329 |
| 2011/0134757 A1 | 6/2011 | Lin et al. | |
| 2011/0194433 A1 | 8/2011 | Song et al. | |
| 2012/0051288 A1* | 3/2012 | Dwyer et al. | 370/328 |
| 2012/0207011 A1* | 8/2012 | Franklin et al. | 370/216 |
| 2013/0040667 A1 | 2/2013 | Torsner et al. | |
| 2013/0250790 A1* | 9/2013 | Lin et al. | 370/252 |
| 2014/0051454 A1* | 2/2014 | Wirtanen et al. | 455/452.1 |
| 2014/0314021 A1* | 10/2014 | Pelletier et al. | 370/329 |

FOREIGN PATENT DOCUMENTS

| | | |
|---|---|---|
| KR | 20100110033 A | 10/2010 |
| WO | 2005079085 A1 | 8/2005 |
| WO | 2008072005 A2 | 6/2008 |

OTHER PUBLICATIONS

Alcatel-Lucent, Alcatel-Lucent Shanghai Bell 3GPP TSG-RAN WG2 Meeting #72bis Jan. 2011, R2-110103.*

International Search Report and Written Opinion—PCT/US2013/050846—ISA/EPO—Mar. 12, 2014.

International Search Report and Written Opinion—PCT/US20013/050846—ISA/EPO—Mar. 12, 2014 10 pages.

* cited by examiner

METHOD AND APPARATUS FOR DYNAMICALLY CONFIGURING A CELL UPDATE MESSAGE

CLAIM OF PRIORITY UNDER 35 U.S.C. §119

The present Application for Patent claims priority to U.S. Provisional Patent Application No. 61/673,875 filed Jul. 20, 2012, entitled "Dynamically build Cell Update message based on the network capability and call type," which is assigned to the assignee hereof, and hereby expressly incorporated by reference herein.

BACKGROUND

1. Field

Aspects of the present disclosure relate generally to wireless communication systems, and more particularly, to configuration of cell update message.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division—Code Division Multiple Access (TD-CDMA), and Time Division—Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

In UMTS networks, a user equipment (UE) indicates the capabilities of the UE to a base station and/or a network in a cell update message. In legacy networks, for example, networks based on 3GPP pre-release 8 standards, the size of the cell update message is generally configured by the network, for example, to 21 bytes.

For UEs that can support 3GPP Release 8 (or later), the UEs can support additional features and indicate these new capabilities in a cell update message to the network. However, the size of the cell update message from the UE may exceed the size configured by the network and may result in failure of cell update procedure. One approach to address this problem is to reduce the size of the cell update message by removing a "Measured Results on RACH" information element (IE) from the cell update message. But, the size of the cell update message may still exceed the size configured by the network even after the "Measured Results on RACH" IE is removed from the cell update message.

Thus, there is a need for a method and apparatus for dynamically configuring a cell update message that is within the size allowed by the network without negatively impacting the performance of the UE and/or network.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure presents an example method and apparatus for wireless communication. For example, the present disclosure presents an example method for dynamically configuring a cell update message at a user equipment (UE) that includes determining that a size of the cell update message at the UE is above a threshold value after a "measured results on random access channel (RACH)" information element (IE) is excluded from the cell update message, and removing one or more IEs from the cell update message until the size of the cell update message is at or below the threshold value.

In an additional aspect, the present disclosure presents an example apparatus for dynamically configuring a cell update message at a user equipment (UE) which may include means for determining that a size of the cell update message at the UE is above a threshold value after a "measured results on random access channel (RACH)" information element (IE) is excluded from the cell update message, and means for removing one or more IEs from the cell update message until the size of the cell update message is at or below the threshold value.

Moreover, the present disclosure presents an example computer program product for dynamically configuring a cell update message at a user equipment (UE) which may include a computer-readable medium that includes code for determining that a size of the cell update message at the UE is above a threshold value after a "measured results on random access channel (RACH)" information element (IE) is excluded from the cell update message, and removing one or more IEs from the cell update message until the size of the cell update message is at or below the threshold value.

In a further aspect, the present disclosure presents an apparatus for dynamically configuring a cell update message at a user equipment (UE) which may include a cell update message size determining component configured to determine that a size of a cell update message at the UE is above a threshold value after a "measured results on random access channel (RACH)" information element (IE) is excluded from the cell update message, and an information element (IE) removal component configured to remove one or more additional IEs from the cell update message until the size of the cell update message is at or below the threshold value.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present disclosure provides a method and an apparatus for dynamically configuring a cell update message at a user equipment by determining that a size of the cell update message at the UE is above a threshold value after a "measured results on random access channel (RACH)" information element (IE) is excluded from the cell update message, and removing one or more IEs from the cell update message until the size of the cell update message is at or below the threshold value.

Figure 1:
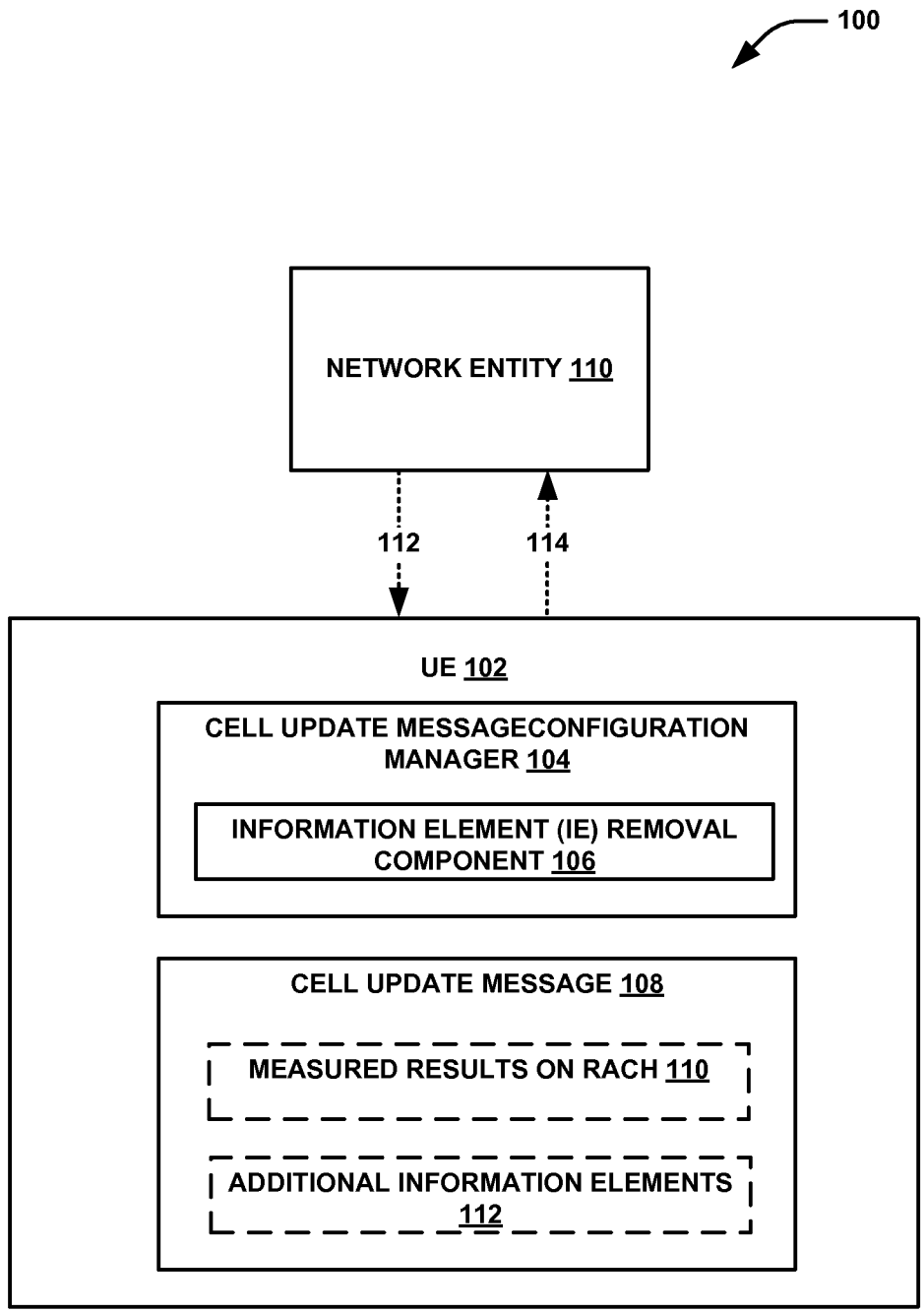
FIG. 1 is a block diagram illustrating an example wireless system of aspects of the present disclosure.

Referring to FIG. 1, a wireless communication system 100 is illustrated that facilitates dynamically configuring a cell update message. System 100 includes a user equipment (UE) 102 that can communicate with one or more network entities 110, which may include one or more macro cell and/or femtocell network entities via one or more over-the-air links 112 and/or 114. Furthermore, the one or more network entities 110 may each be associated with a macro cell or a femtocell, each of which may be a candidate for receiving a cell update message 108 from UE 102.

In an aspect, UE 102 may be configured to transmit one or more messages to network entity 110 over the link 114 and/or receive one or more message from network entity 110 over the link 112. In an aspect, the messages transmitted from UE 102 to network entity 110 may include, but are not limited to, cell update messages 108, measurement reports, data packets, signaling messages, cell discovery indicators, cell ranking information, handover target cell selection, etc.

In an aspect, UE 102 may include cell update message configuration manager 104 to dynamically configure a cell update message 108 at UE 102. In an aspect, for example, UE 102 may be configured to include an information element (IE) removal component 106 to remove or exclude one or more IEs, for example, additional information elements 112, from cell update message 108 until the size of the cell update message is at or below a threshold value configured by the network entity 110.

In an additional or optional aspect, IE removal component 106 may be configured remove one or more additional IEs 112 from the cell update message when a size of the cell update message at the UE is above a threshold value after a "measured results on random access channel (RACH)" information element (IE) 110 is excluded from the cell update message. In an additional aspect, the threshold value may be configured by an operator of network entity 110. For example, the operator of network entity 110 may configure the threshold size to twenty one bytes.

In an additional aspect, UE 102 may be a mobile apparatus and may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

Additionally, network entity 110 of system 100 may include one or more of any type of network components, such as an access point, including a base station (BS) or a Node B, eNodeB, a macro base station, a small base station, for example, a microcell, a femtocell, or a pico cell, a relay, a peer-to-peer device, an authentication, authorization and accounting (AAA) server, a mobile switching center (MSC), a radio network controller (RNC), etc.

Figure 2:
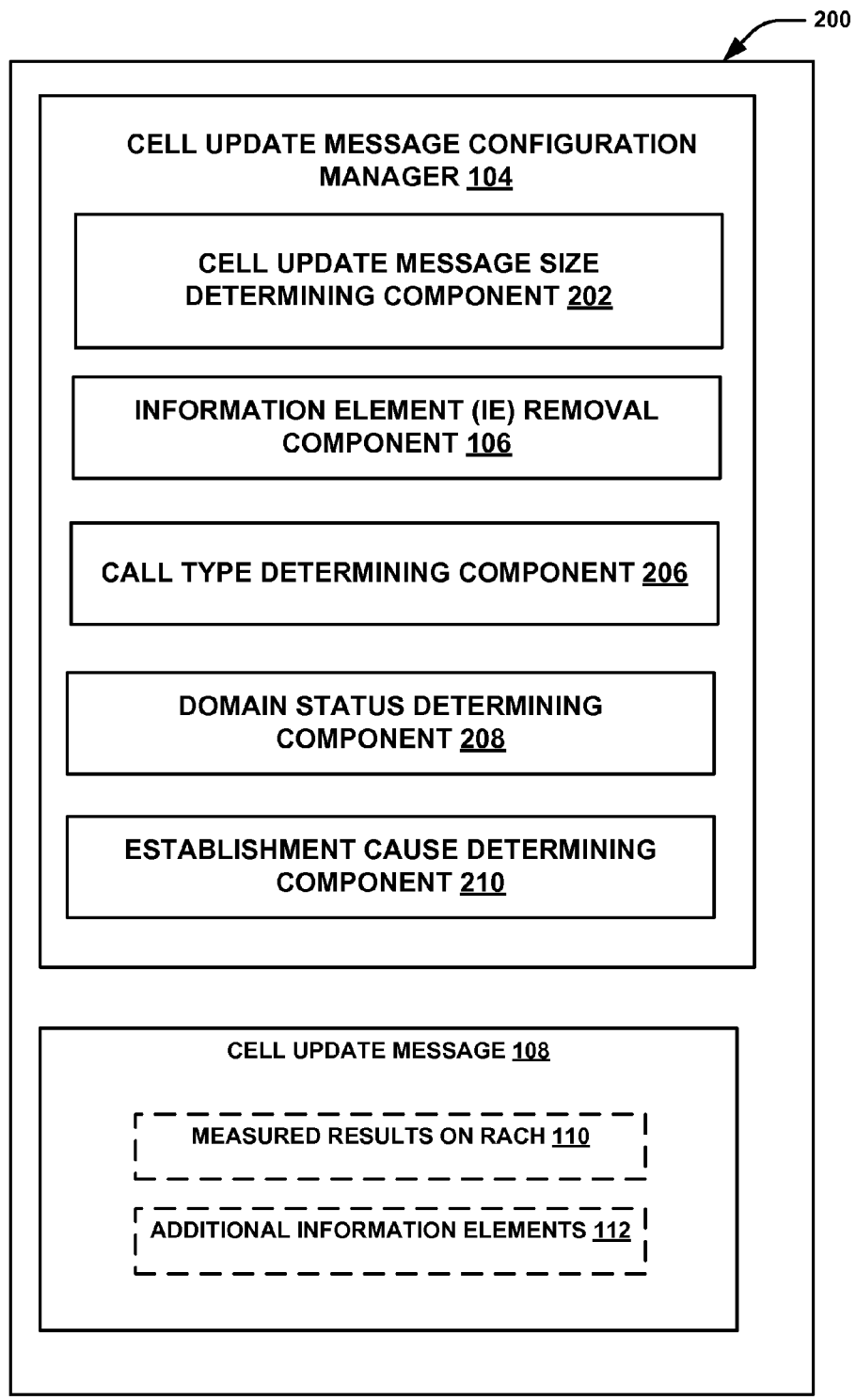
FIG. 2 is a block diagram illustrating an example cell update message configuration manager in aspects of the present disclosure.

FIG. 2 illustrates, for example, a more detailed aspect of cell update message configuration manager 104, which may be configured to dynamically configure a cell update message 108 at UE 102 by determining that the size of a cell update message at the UE is above a threshold value after a "measured results on random access channel (RACH)" information element (IE) 110 is excluded from cell update message 108, and by removing one or more additional IEs 112 from cell update message 108 until the size of the cell update message is at or below the threshold value. In an example aspect, cell update message configuration manager 104 may be configured to include cell update message size determining component 202, information element (IE) removal component 106, call type determining component 206, domain status determining component 208, and establishment cause determining component 210.

In an aspect, cell update message size determining component 202 can be configured to determine the size of cell update message 108 and compare the determined size with a threshold value. For example, the cell update message size determining component 202 can calculate the size of the cell update message prior to sending the cell update message to network entity 110. If the size of the cell update message is higher than the size configured/recognized by network entity 110, the network entity 110 may not receive and/or process the cell update message from UE 102, resulting in a failure of the cell update procedure which may impact the performance of UE 102 and/or network entity 110.

In an additional or optional aspect, if the size of the cell update message is above a threshold value, information element (IE) removal component 106 checks if a "measured results on random access channel (RACH)" information element (IE) 110 is removed from cell update message 108. If not, information element (IE) removal component 106 removes "measured results on random access channel (RACH)" IE 110 from the cell update message, and the size of the cell update message is measured again by cell update message size determining component 202 prior to sending the cell update message to network entity 110. If so, or if the cell update message is measured to exceed the threshold value after removal of "measured results on random access channel (RACH)" information element (IE) 110, then IE removal component 106 is configured to remove one or more additional IEs 112 until the size of cell update message 108 is at or below the threshold value.

In an example aspect, IE removal component 106 may be configured to select the one or more additional IEs 112 to be removed from the cell update message from a list that includes one or more of a "Support for Two DRX schemes in URA_PCH and CELL_PCH" IE, a "High-Speed Physical Downlink Shared Channel (HS-PDSCH) in CELL_FACH" IE, a "Support of High Speed Downlink Shared Channel (HS-DSCH) DRX operation" IE, a "Support of common Enhanced uplink Dedicated Channel (E-DCH)" IE, a "Support of Media Access Control (MAC)-i/is" IE, a "Support of Semi-Persistent scheduling (SPS) operation" IE, a "Support of Control Channel discontinuous reception (DRX) operation" IE, a "HS-PDSCH in CELL_FACH" IE, a "START value" IE for an inactive domain, and an "establishment cause" IE. In an optional aspect, the detailed description for additional IEs 112 above can be found in 3GPP Specification. In an optional aspect, IE removal component 106 may be configured to remove the one or more additional IEs 112 in a certain order, or based on a relative priority associated with each of the one or more additional IEs 112, where the order or priority may be defined by an operator and/or determined based on a given network configuration.

As such, in an aspect, cell update message size determining component 202 checks the size of cell update message 108 after "measured results on RACH" IE 110 is removed from the cell update message. If the size of the cell update message is above the threshold value, IE removal component 106 removes "Support for Two DRX schemes in URA_PCH and CELL_PCH" IE from the cell update message. The size of the cell update message is checked after removes "Support for Two DRX schemes in URA_PCH and CELL_PCH" IE is removed from the cell update message.

In an aspect, once "Support for Two DRX schemes in URA_PCH and CELL_PCH" IE is removed from the cell update message, and the size of the cell update message is determined to be above the threshold value, call type determining component 206 may be configured to determine whether the cell update procedure that triggered the cell update message is initiated due a circuit switched (CS) call, for example, based on information from the cell update procedure. If the cell type determining component 206 determines that the cell update message is trigged due to a CS call, IE removal component 106 removes or excludes one or more of "HS-PDSCH in CELL_FACH" IE, "Support of HS-DSCH DRX operation" IE, "Support of common E-DCH" IE, "Support of MAC-i/is" IE and "Support of SPS operation" IE from the cell update message.

In another aspect, call type determining component 206 may be configured determines whether the cell update procedure that triggered the cell update message is initiated due a packet switched (PS) call, for example, based on information from the cell update procedure. If the cell type determining component 206 determines that the cell update message is triggered due to a PS call, call type determining component 206 further determines whether network entity 106 to which the cell update message is being sent supports HS-DSCH in CELL_FACH mode. If the call type determining component 206 determines that the network entity 110 does not support HS-DSCH in CELL_FACH mode, IE removal component 106 removes or excludes one or more of "Support of HS-DSCH DRX operation" IE, "Support of common E-DCH" IE, "Support of MAC-i/is" IE, "Support of SPS operation" IE, "Support of Control Channel DRX operation" IE from the cell update message.

In an additional or alternative aspect, when call type determining component 206 determines that the cell update message is triggered due to a PS call, call type determining component 206 further determines whether network entity 110 to which the cell update message is being sent supports enhanced uplink in CELL_FACH model. If call type determining component 206 determines that network entity 110 does not support enhanced uplink in CELL_FACH mode, IE removal component 106 removes or excludes "Support of HS-DSCH DRX operation" IE, "Support of common E-DCH" IE, "HS-PDSCH in CELL_FACH" IE, "Support of MAC-i/is" IE, "Support of SPS operation" IE, and "Support of Control Channel DRX operation" IE from the cell update message.

In an aspect, domain status determining component 208 determines whether a circuit switched or a packet switched domain is inactive. When domain status determining component 208 determines that the circuit switched domain is inactive, "START value" IE for the circuit switched domain is removed or excluded from the cell update message as the IE associated with the inactive domain may not be required. When domain status determining component 208 determines that the packet switched domain is inactive, "START value" IE for the packet switched domain is removed or excluded from the cell update message.

In an aspect, establishment cause determining component 210 may determine whether establishment cause IE is included in the cell update message. If it is included, IE removal component 202 may remove or exclude establishment cause IE from the cell update message. Additionally, if the cell update message is still above the threshold, the UE could transition to an idle mode.

In an aspect, the order in which the IEs are removed from the cell update message may be pre-determined or pre-configured by the network operator of network entity 110. In addition, the functional aspects and/or structure of the UE 102 and/or cell update configuration manager 104 (FIGS. 1 and 2) described above may be utilized for dynamically configuring a cell update message at a user equipment to improve performance of a UE 102 and/or network entity 110.

Figure 3:
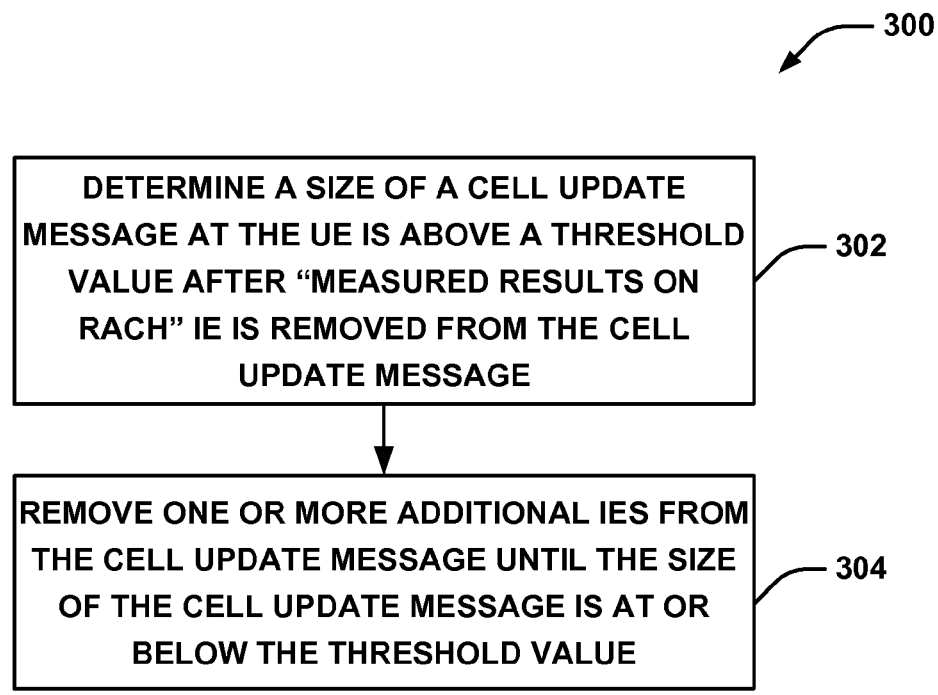
FIG. 3 is a flow diagram illustrating aspects of a method for dynamically configuring a cell update message according to aspects of the present disclosure.

FIG. 3 illustrates an example methodology 300 for dynamically configuring a cell update message at a user equipment (UE).

In an aspect, at block 302, methodology 300 may include determining that a size of the cell update message at the UE is above a threshold value after "measured results on random access channel (RACH)" information element (IE) is excluded from the cell update message. For example, in an aspect, UE 102 and/or cell update message configuration manager 104 and/or cell update message size determining component 202 may determine the size of a cell update message is above a threshold value after "measured results on RACH" IE 110 is removed from the cell update message.

In an aspect, at block 304, methodology 300 may include removing one or more IEs from the cell update message until the size of the cell update message is at or below the threshold value. For example, in an aspect, UE 102 and/or cell update message configuration manager 104 and/or information element (IE) removal component 106 may remove one or more IEs from the cell update message until the size of the cell update message is at or below the threshold value.

In an example aspect, the one or more IEs to be removed from the cell update message can be selected from a list that includes "Support for Two DRX schemes in URA_PCH and CELL_PCH" IE, a "High-Speed Physical Downlink Shared Channel (HS-PDSCH) in CELL_FACH" IE, a "Support of High Speed Downlink Shared Channel (HS-DSCH) DRX operation" IE, a "Support of common Enhanced uplink Dedicated Channel (E-DCH)" IE, a "Support of Media Access Control (MAC)-i/is" IE, a "Support of Semi-Persistent scheduling (SPS) operation" IE, a "Support of Control Channel discontinuous reception (DRX) operation" IE, a "HS-PDSCH in CELL_FACH" IE, a "START value" IE for an inactive domain, and an "establishment cause" IE as described in FIG. 2 above. The cell update configuration manager 104 dynamically configures the cell update message by removing IEs as described above.

Figure 4:
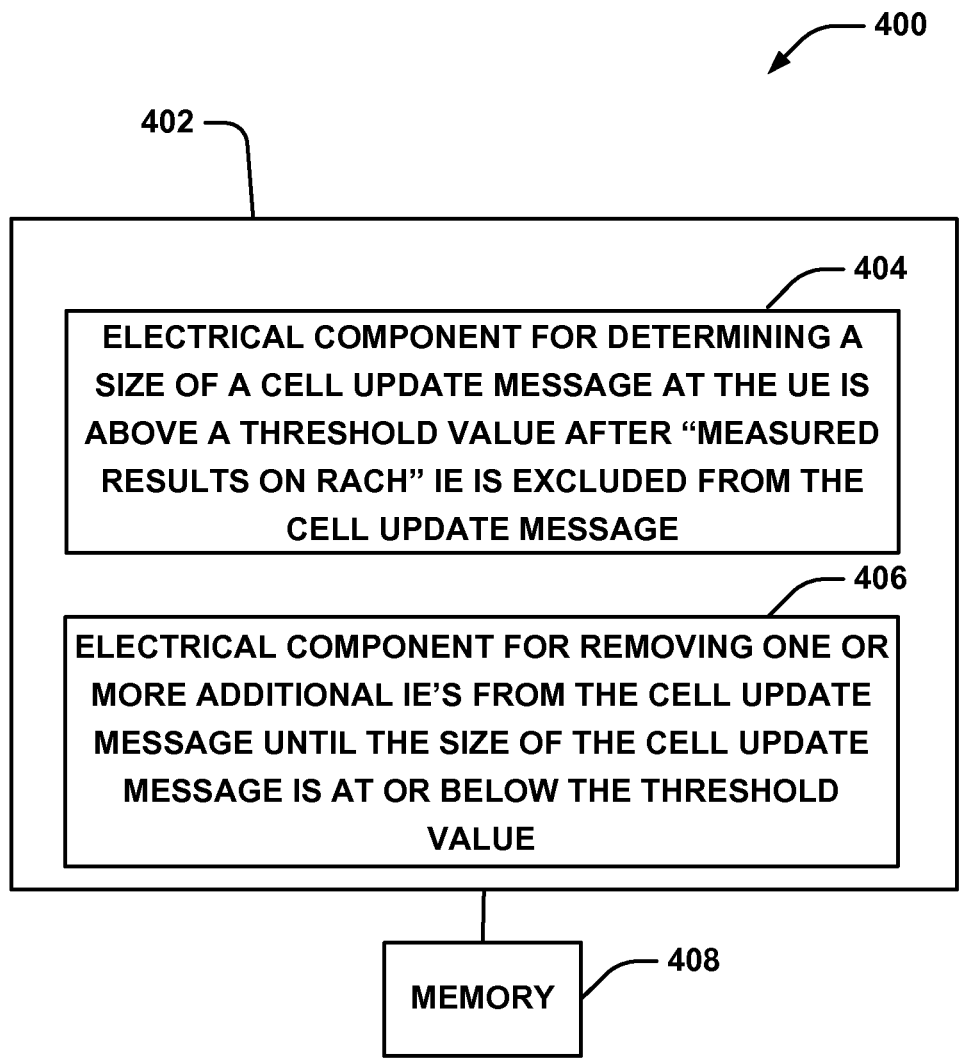
FIG. 4 is a component diagram illustrating aspects of a logical grouping of electrical components as contemplated by the present disclosure.

Referring to FIG. 4, an example system 400 is displayed for dynamically configuring a cell update message at a user equipment (UE). For example, system 400 can reside at least partially within UE 102 (FIG. 1). It is to be appreciated that system 400 is represented as including functional blocks, which can be functional blocks that represent functions implemented by a processor, software, or a combination thereof (for example, firmware). System 400 includes a logical grouping 402 of electrical components that can act in conjunction. For instance, logical grouping 402 can include an electrical component 404 for determining that a size of the cell update message at the UE is above a threshold value after a "measured results on random access channel (RACH)" information element (IE) is excluded from the cell update message. In an aspect, electrical component 404 may comprise cell update message size determining component 202 (FIG. 2).

Additionally, logical grouping 402 can include an electrical component 406 for removing one or more IEs from the cell update message until the size of the cell update message is at or below the threshold value. In an aspect, electrical component may comprise information element removal component 106 (FIG. 1 and FIG. 2).

Furthermore, system 400 can include a memory 408 that retains instructions for executing functions associated with the electrical components 404 and 406, stores data used or obtained by the electrical components 404 and 406. While shown as being external to memory 408, it is to be understood that one or more of the electrical components 404 and 406 can exist within memory 408. In one example, electrical components 404 and 406 can comprise at least one processor, or each electrical component 404 and 406 can be a corresponding module of at least one processor. Moreover, in an additional or alternative example, electrical components 404 and 406 can be a computer program product including a computer readable medium, where each electrical component 404 and 406 can be corresponding code.

Figure 5:
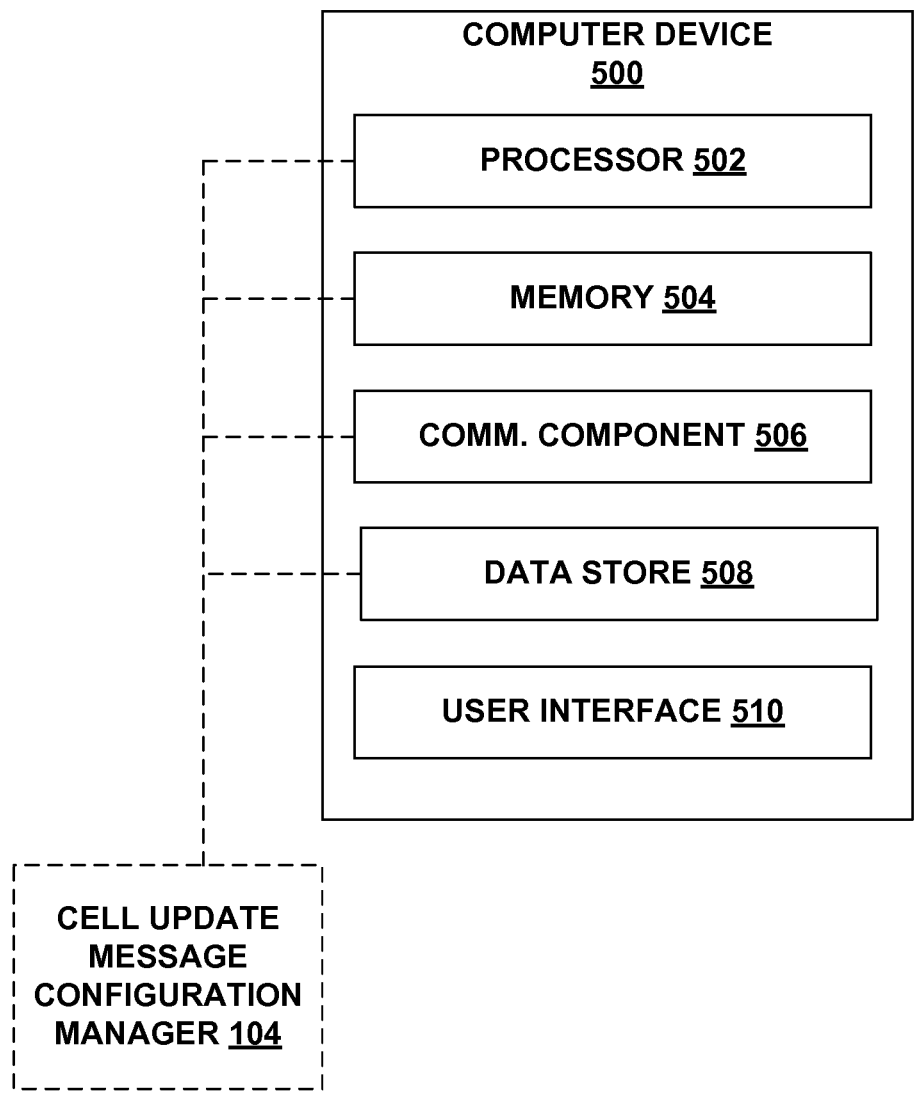
FIG. 5 is a block diagram illustrating aspects of a computer device according to the present disclosure.

Referring to FIG. 5, in an aspect, any of UE 102 or network entity 110 (FIG. 1) may be represented by a specially programmed or configured computer device 500. In one aspect of UE implementation (for example, UE 102 of FIG. 1), computer device 500 may include cell update message configuration manager 104 and/or information element (IE) removal component 106 (FIGS. 1 and 2), such as in specially programmed computer readable instructions or code, firmware, hardware, or some combination thereof. Computer device 500 includes a processor 502 for carrying out processing functions associated with one or more of components and functions described herein. Processor 502 can include a single or multiple set of processors or multi-core processors. Moreover, processor 502 can be implemented as an integrated processing system and/or a distributed processing system.

Computer device 500 further includes a memory 504, such as for storing data used herein and/or local versions of applications being executed by processor 502. Memory 504 can include any type of memory usable by a computer, such as random access memory (RAM), read only memory (ROM), tapes, magnetic discs, optical discs, volatile memory, non-volatile memory, and any combination thereof.

Further, computer device 500 includes a communications component 506 that provides for establishing and maintaining communications with one or more parties utilizing hardware, software, and services as described herein. Communications component 506 may carry communications between components on computer device 500, as well as between computer device 500 and external devices, such as devices located across a communications network and/or devices serially or locally connected to computer device 500. For example, communications component 506 may include one or more buses, and may further include transmit chain components and receive chain components associated with a transmitter and receiver, respectively, or a transceiver, operable for interfacing with external devices. In an additional aspect, communications component 506 may be configured to receive one or more pages from one or more subscriber networks. In a further aspect, such a page may correspond to the second subscription and may be received via the first technology type communication services.

Additionally, computer device 500 may further include a data store 508, which can be any suitable combination of hardware and/or software, that provides for mass storage of information, databases, and programs employed in connection with aspects described herein. For example, data store 508 may be a data repository for applications not currently being executed by processor 502 and/or any threshold values or finger position values.

Computer device 500 may additionally include a user interface component 510 operable to receive inputs from a user of computer device 500 and further operable to generate outputs for presentation to the user. User interface component 510 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 510 may include one or more output devices, including but not limited to a display, a speaker, a haptic feedback mechanism, a printer, any other mechanism capable of presenting an output to a user, or any combination thereof.

Figure 6:
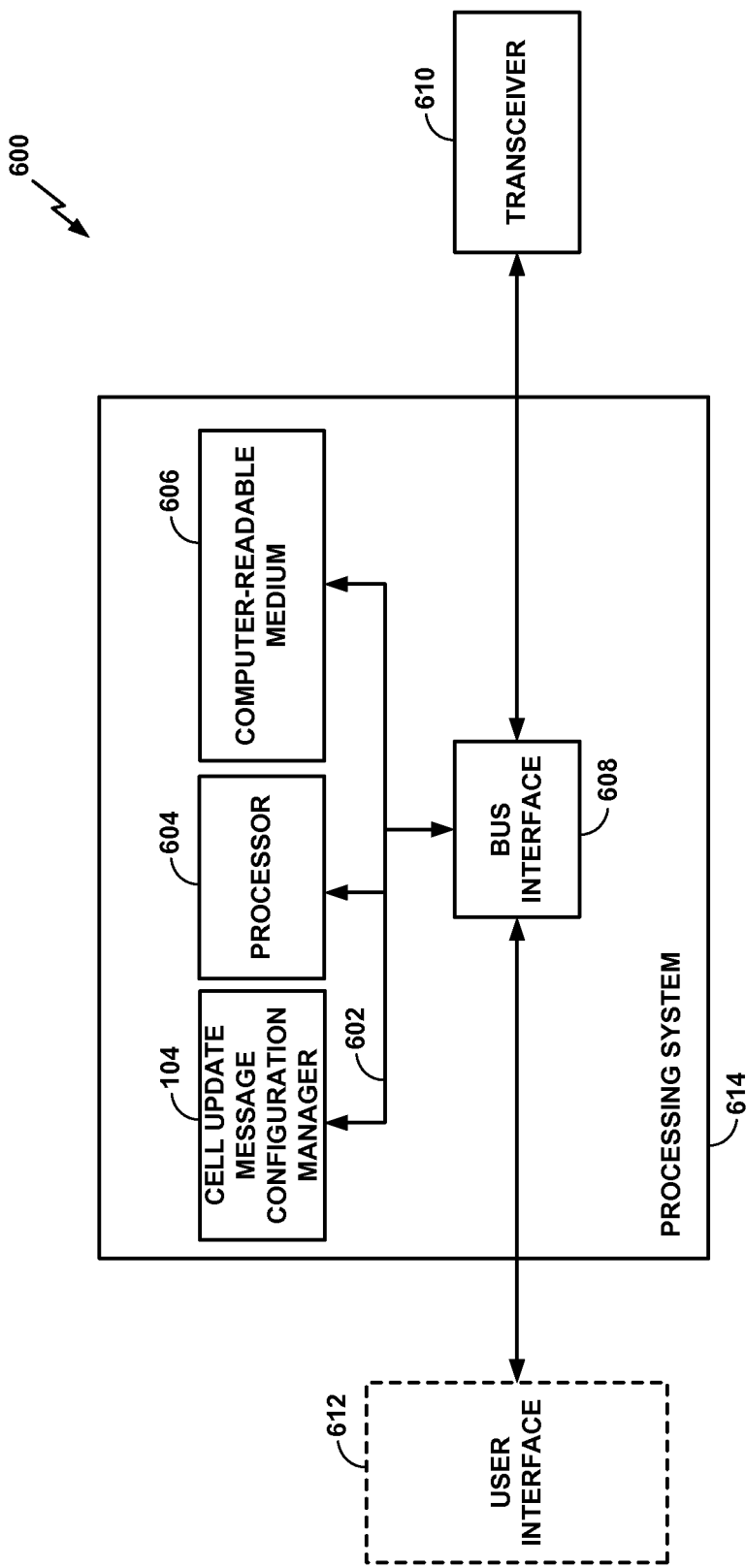
FIG. 6 is a block diagram illustrating an example of a hardware implementation for an apparatus employing a processing system.

FIG. 6 is a block diagram illustrating an example of a hardware implementation for an apparatus 600 employing a processing system 614 for carrying out aspects of the present disclosure, such as methods for dynamically configuring a cell update message at a user equipment (UE), including cell update message configuration manager 104 and/or information element (IE) removal component 106 (FIGS. 1 and 2). In this example, the processing system 614 may be implemented with bus architecture, represented generally by a bus 602. The bus 602 may include any number of interconnecting buses and bridges depending on the specific application of the processing system 614 and the overall design constraints. The bus 602 links together various circuits including one or more processors, represented generally by the processor 604, computer-readable media, represented generally by the computer-readable medium 606, and one or more components described herein, such as, but not limited to, cell update message configuration manager 104 (FIGS. 1 and 2). The bus 602 may also link various other circuits such as timing sources, peripherals, voltage regulators, and power management circuits, which are well known in the art, and therefore, will not be described any further. A bus interface 608 provides an interface between the bus 602 and a transceiver 610. The transceiver 610 provides a means for communicating with various other apparatus over a transmission medium. Depending upon the nature of the apparatus, a user interface 612 (e.g., keypad, display, speaker, microphone, joystick) may also be provided.

The processor 604 is responsible for managing the bus 602 and general processing, including the execution of software stored on the computer-readable medium 606. The software, when executed by the processor 604, causes the processing system 614 to perform the various functions described infra for any particular apparatus. The computer-readable medium 606 may also be used for storing data that is manipulated by the processor 604 when executing software.

Figure 7:
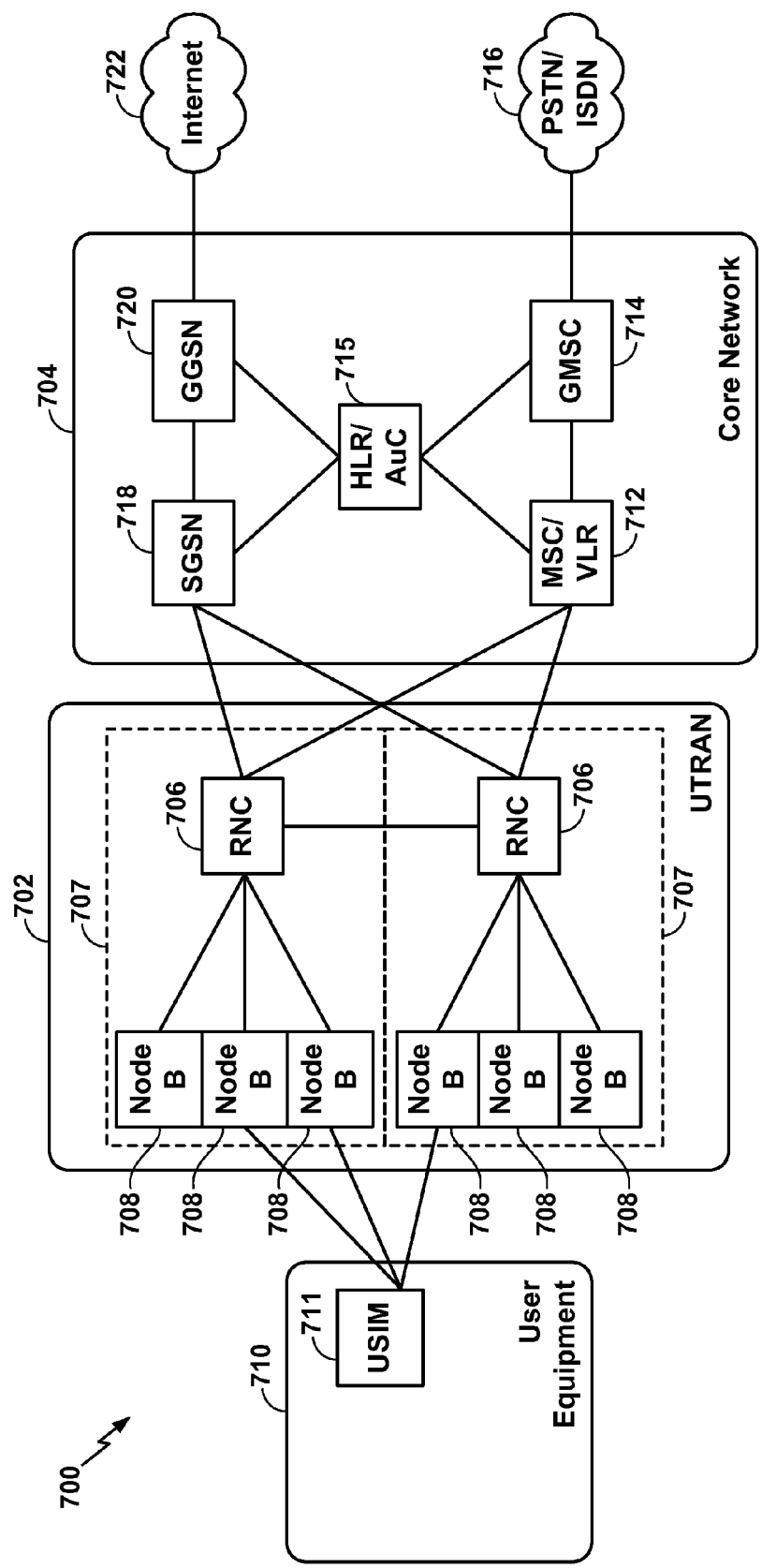
FIG. 7 is a block diagram conceptually illustrating an example of a telecommunications system.

The various concepts presented throughout this disclosure may be implemented across a broad variety of telecommunication systems, network architectures, and communication standards. By way of example and without limitation, the aspects of the present disclosure illustrated in FIG. 7 are presented with reference to a UMTS system 700 employing a W-CDMA air interface, and may include a UE 102 executing an aspect of cell update message configuration manager 104 and/or information element (IE) removal component 106 of FIGS. 1 and 2. A UMTS network includes three interacting domains: a Core Network (CN) 704, a UMTS Terrestrial Radio Access Network (UTRAN) 702, and UE 104. In an aspect, as noted, UE 710 may be UE 102 (FIG. 1) and may be configured to perform functions thereof, for example, including dynamically configuring a cell update message by cell update message configuration manager 104. Further, UTRAN 702 may comprise a RAT network entity 106 (FIG. 1), which in this case may be respective ones of the Node Bs 708. In this example, UTRAN 702 provides various wireless services including telephony, video, data, messaging, broadcasts, and/or other services. The UTRAN 702 may include a plurality of Radio Network Subsystems (RNSs) such as an RNS 707, each controlled by a respective Radio Network Controller (RNC) such as an RNC 706. Here, the UTRAN 702 may include any number of RNCs 706 and RNSs 707 in addition to the RNCs 706 and RNSs 707 illustrated herein. The RNC 706 is an apparatus responsible for, among other things, assigning, reconfiguring, and releasing radio resources within the RNS 707. The RNC 706 may be interconnected to other RNCs (not shown) in the UTRAN 702 through various types of interfaces such as a direct physical connection, a virtual network, or the like, using any suitable transport network.

Communication between UE 710 and Node B 708 may be considered as including a physical (PHY) layer and a medium access control (MAC) layer. Further, communication between UE 710 and RNC 706 by way of a respective Node B 708 may be considered as including a radio resource control (RRC) layer. In the instant specification, the PHY layer may be considered layer 1; the MAC layer may be considered layer 7; and the RRC layer may be considered layer 3. Information herein below utilizes terminology introduced in the RRC Protocol Specification, 3GPP TS 75.331 v9.1.0, incorporated herein by reference.

The geographic region covered by the RNS 707 may be divided into a number of cells, with a radio transceiver apparatus serving each cell. A radio transceiver apparatus is commonly referred to as a NodeB in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 708 are shown in each RNS 707; however, the RNSs 707 may include any number of wireless Node Bs. The Node Bs 708 provide wireless access points to a CN 704 for any number of mobile apparatuses, such as UE 102 or 710, and may be macro cell network entity 106 or optional femtocell network entity 108 of FIG. 1. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus in this case is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

In a UMTS system, the UE 710 may further include a universal subscriber identity module (USIM) 711, which contains a user's subscription information to a network. For illustrative purposes, one UE 710 is shown in communication with a number of the Node Bs 708. The DL, also called the forward link, refers to the communication link from a NodeB 708 to a UE 710, and the UL, also called the reverse link, refers to the communication link from a UE 710 to a NodeB 708.

The CN 704 interfaces with one or more access networks, such as the UTRAN 702. As shown, the CN 704 is a GSM core network. However, as those skilled in the art will recognize, the various concepts presented throughout this disclosure may be implemented in a RAN, or other suitable access network, to provide UEs with access to types of CNs other than GSM networks.

The CN 704 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 704 supports circuit-switched services with a MSC 712 and a GMSC 714. In some applications, the GMSC 714 may be referred to as a media gateway (MGW). One or more RNCs, such as the RNC 706, may be connected to the MSC 712. The MSC 712 is an apparatus that controls call setup, call routing, and UE mobility functions. The MSC 712 also includes a VLR that contains subscriber-related information for the duration that a UE is in the coverage area of the MSC 712. The GMSC 714 provides a gateway through the MSC 712 for the UE to access a circuit-switched network 716. The GMSC 714 includes a home location register (HLR) 715 containing subscriber data, such as the data reflecting the details of the services to which a particular user has subscribed. The HLR is also associated with an authentication center (AuC) that contains subscriber-specific authentication data. When a call is received for a particular UE, the GMSC 714 queries the HLR 715 to determine the UE's location and forwards the call to the particular MSC serving that location.

The CN 704 also supports packet-data services with a serving GPRS support node (SGSN) 718 and a gateway GPRS support node (GGSN) 720. GPRS, which stands for General Packet Radio Service, is designed to provide packet-data services at speeds higher than those available with standard circuit-switched data services. The GGSN 720 provides a connection for the UTRAN 702 to a packet-based network 722. The packet-based network 722 may be the Internet, a private data network, or some other suitable packet-based network. The primary function of the GGSN 720 is to provide the UEs 710 with packet-based network connectivity. Data packets may be transferred between the GGSN 720 and the UEs 710 through the SGSN 718, which performs primarily the same functions in the packet-based domain as the MSC 712 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a NodeB 708 and a UE 710. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 710 provides feedback to Node B 708 over the HS-DPCCH to indicate whether it correctly decoded a packet on the downlink.

HS-DPCCH further includes feedback signaling from the UE 710 to assist the Node B 708 in taking the right decision in terms of modulation and coding scheme and precoding weight selection, this feedback signaling including the CQI and PCI.

HSPA Evolved or HSPA+ is an evolution of the HSPA standard that includes MIMO and 64-QAM, enabling increased throughput and higher performance. That is, in an aspect of the disclosure, the Node B 708 and/or the UE 710 may have multiple antennas supporting MIMO technology. The use of MIMO technology enables the Node B 708 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 710 to increase the data rate or to multiple UEs 710 to increase the overall system capacity. This is achieved by spatially precoding each data stream and then transmitting each spatially precoded stream through a different transmit antenna on the downlink. The spatially precoded data streams arrive at the UE(s) 710 with different spatial signatures, which enables each of the UE(s) 710 to recover the one or more the data streams destined for that UE 710. On the uplink, each UE 710 may transmit one or more spatially precoded data streams, which enables Node B 708 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 8:
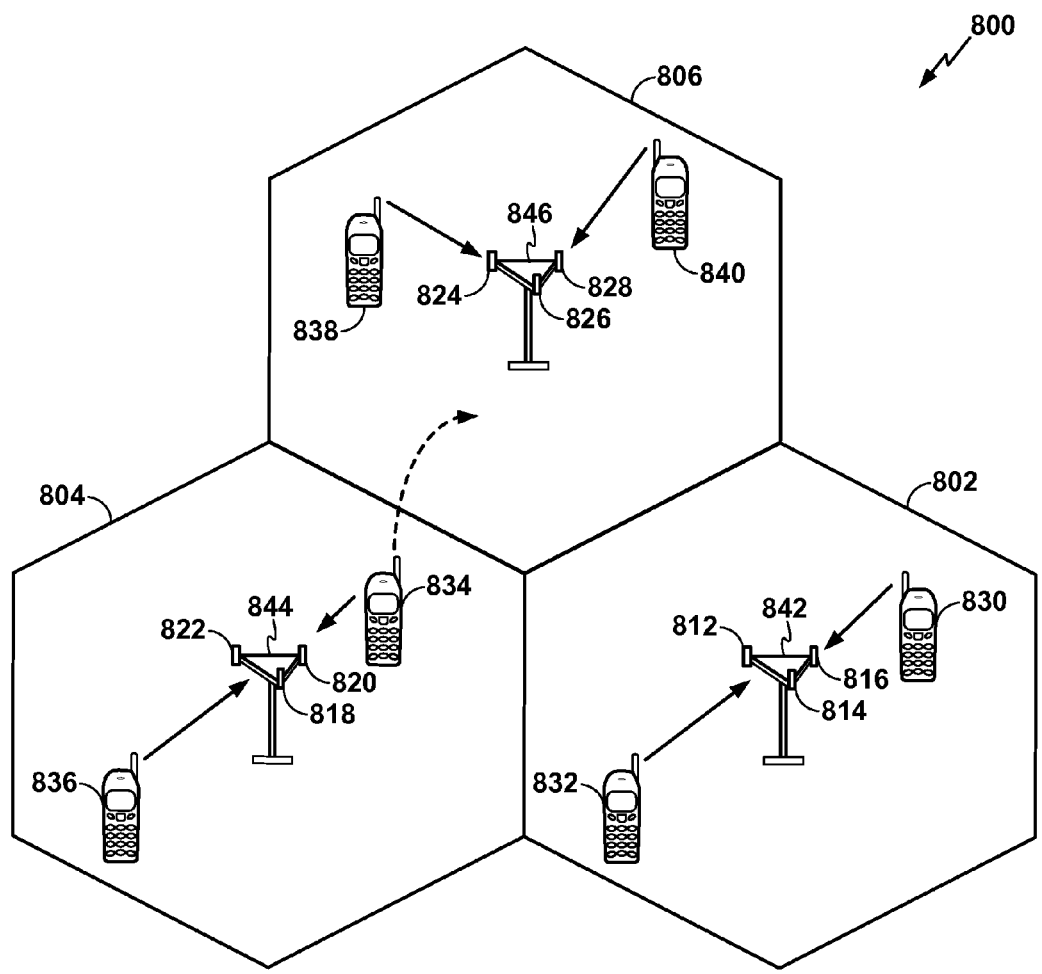
FIG. 8 is a conceptual diagram illustrating an example of an access network.

Referring to FIG. 8, an access network 800 in a UTRAN architecture is illustrated, and may include one or more UEs configured to include cell update message configuration manager 104 and/or information element (IE) removal component 106 (FIGS. 1 and 2) for determining reselection parameters for detected cells. The multiple access wireless communication system includes multiple cellular regions (cells), including cells 802, 804, and 806, each of which may include one or more sectors. The multiple sectors can be formed by groups of antennas with each antenna responsible for communication with UEs in a portion of the cell. For example, in cell 802, antenna groups 812, 814, and 816 may each correspond to a different sector. In cell 804, antenna groups 818, 820, and 822 each correspond to a different sector. In cell 806, antenna groups 824, 826, and 828 each correspond to a different sector. The cells 802, 804 and 806 may include several wireless communication devices, e.g., User Equipment or UEs, for example, including reselection manager 105 of FIG. 1, which may be in communication with one or more sectors of each cell 802, 804 or 806. For example, UEs 830 and 832 may be in communication with NodeB 842, UEs 834 and 836 may be in communication with NodeB 844, and UEs 838 and 840 can be in communication with NodeB 846. Here, each NodeB 842, 844, 846 is configured to provide an access point to a CN 704 (FIG. 7) for all the UEs 830, 832, 834, 836, 838, 840 in the respective cells 802, 804, and 806. Additionally, each NodeB 842, 844, 846 and UEs 830, 832, 834, 836, 838, 840 may be UE 102 of FIG. 1 and may perform the methods outlined herein.

As the UE 834 moves from the illustrated location in cell 804 into cell 806, a serving cell change (SCC) or handover may occur in which communication with the UE 834 transitions from the cell 804, which may be referred to as the source cell, to cell 806, which may be referred to as the target cell. Management of the handover procedure may take place at the UE 834, at the Node Bs corresponding to the respective cells, at a radio network controller 706 (FIG. 7), or at another suitable node in the wireless network. For example, during a call with the source cell 804, or at any other time, the UE 834 may monitor various parameters of the source cell 804 as well as various parameters of neighboring cells such as cells 806 and 802. Further, depending on the quality of these parameters, the UE 834 may maintain communication with one or more of the neighboring cells. During this time, the UE 834 may maintain an Active Set, that is, a list of cells that the UE 834 is simultaneously connected to (e.g., the UTRA cells that are currently assigning a downlink dedicated physical channel DPCH or fractional downlink dedicated physical channel F-DPCH to the UE 834 may constitute the Active Set). In any case, UE 834 may execute reselection manager 104 to perform the reselection operations described herein.

Further, the modulation and multiple access scheme employed by the access network 700 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 9:
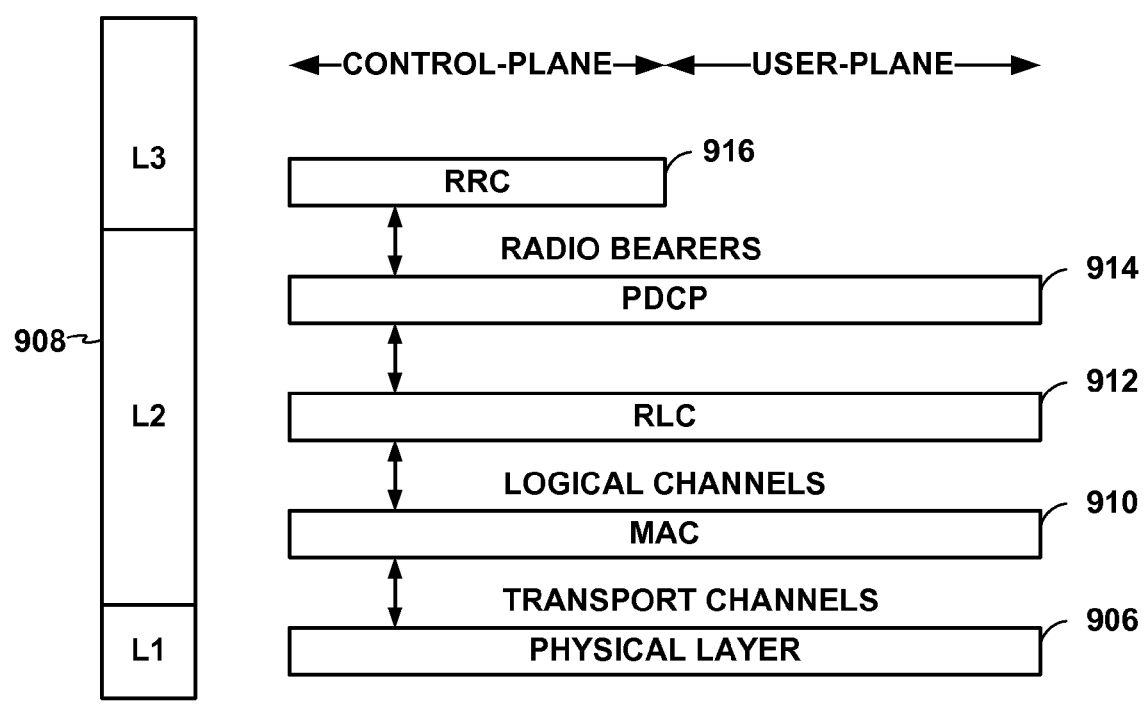
FIG. 9 is a conceptual diagram illustrating an example of a radio protocol architecture for the user and control plane.

The radio protocol architecture may take on various forms depending on the particular application. An example for an HSPA system will now be presented with reference to FIG. 9. FIG. 9 is a conceptual diagram illustrating an example of the radio protocol architecture for the user and control planes.

Turning to FIG. 9, the radio protocol architecture for the UE, for example, UE 102 of FIG. 1 configured to include cell update message configuration manager 104 and/or information element (IE) removal component 106 (FIGS. 1 and 2) for dynamically configuring a cell updating message, and a Node B is shown with three layers: Layer 1, Layer 2, and Layer 3. Layer 1 is the lowest lower and implements various physical layer signal processing functions. Layer 1 will be referred to herein as the physical layer 906. Layer 2 (L2 layer) 908 is above the physical layer 906 and is responsible for the link between the UE and node B over the physical layer 906.

In the user plane, the L2 layer 908 includes a media access control (MAC) sublayer 910, a radio link control (RLC) sublayer 912, and a packet data convergence protocol (PDCP) 914 sublayer, which are terminated at the node B on the network side. Although not shown, the UE may have several upper layers above the L2 layer 908 including a network layer (e.g., IP layer) that is terminated at a PDN gateway on the network side, and an application layer that is terminated at the other end of the connection (e.g., far end UE, server, etc.).

The PDCP sublayer 914 provides multiplexing between different radio bearers and logical channels. The PDCP sublayer 914 also provides header compression for upper layer data packets to reduce radio transmission overhead, security by ciphering the data packets, and handover support for UEs between NodeBs. The RLC sublayer 912 provides segmentation and reassembly of upper layer data packets, retransmission of lost data packets, and reordering of data packets to compensate for out-of-order reception due to hybrid automatic repeat request (HARQ). The MAC sublayer 910 provides multiplexing between logical and transport channels. The MAC sublayer 910 is also responsible for allocating the various radio resources (e.g., resource blocks) in one cell among the UEs. The MAC sublayer 910 is also responsible for HARQ operations.

In the control plane, the radio protocol architecture for the UE and eNB is substantially the same for the physical layer 906 and the L2 layer 908 with the exception that there is no header compression function for the control plane. The control plane also includes a radio resource control (RRC) sublayer 916 in Layer 3 (L3 layer). The RRC sublayer 916 is responsible for obtaining radio resources (i.e., radio bearers) and for configuring the lower layers using RRC signaling between the eNB and the UE.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for dynamically configuring a cell update message at a user equipment (UE), comprising:
   removing a "measured results on random access channel (RACH)" information element (IE) from a cell update message, wherein the "measured results on RACH" IE comprises cell measurement results for monitored cells other than a current cell, such that removing the "measured results on RACH" IE removes the measured results from the cell update message;
   determining that a size of the cell update message at the UE is above a threshold value after removing the "measured results on RACH" IE from the cell update message; and
   removing one or more IEs from the cell update message until the size of the cell update message is at or below the threshold value, wherein the removed IEs are discarded.

2. The method of claim 1, wherein the one or more IEs removed from the cell update message are selected from a list comprising a "Support for Two DRX schemes in URA_PCH and CELL_PCH" IE, a "High-Speed Physical Downlink Shared Channel (HS-PDSCH) in CELL_FACH" IE, a "Support of High Speed Downlink Shared Channel (HS-DSCH) DRX operation" IE, a "Support of common Enhanced uplink Dedicated Channel (E-DCH)" IE, a "Support of Media Access Control (MAC)-i/is" IE, a "Support of Semi-Persistent scheduling (SPS) operation" IE, a "Support of Control Channel discontinuous reception (DRX) operation" IE, a "HS-PDSCH in CELL_FACH" IE, a "START value" IE for an inactive domain, and an "establishment cause" IE.

3. The method of claim 2, further comprising:
   removing the "Support for Two DRX schemes in URA_PCH and CELL_PCH" IE from the cell update message.

4. The method of claim 2, further comprising:
   identifying whether a cell update procedure that triggers the cell update message is initiated due to a circuit switched (CS) call; and
   removing the "HS-PDSCH in CELL_FACH" IE, the "Support of HS-DSCH DRX operation" IE, the "Support of common E-DCH" IE, the "Support of MAC-i/is" IE, the "Support of SPS operation" IE, and the "Support of Control Channel DRX operation" IE from the cell update message in response to identifying that the cell update procedure that triggered the cell update message is initiated due to the CS call.

5. The method of claim 2, further comprising:
   identifying whether a cell update procedure that triggers the cell update message is initiated for a packet switched (PS) call;
   determining whether a network on which the cell update message is sent supports HS-DSCH in CELL_FACH mode in response to identifying that the cell update message is initiated for the PS call; and
   removing the "Support of HS-DSCH DRX operation" IE, the "Support of common E-DCH" IE, the "Support of MAC-i/is" IE, the "Support of SPS operation" IE, the "Support of Control Channel DRX operation" IE from the cell update message in response to determining that the network does not support HS-DSCH in CELL_FACH mode.

6. The method of claim 2, further comprising:
   identifying whether a cell update procedure that triggers the cell update message is initiated for a packet switched (PS) call;
   determining whether a network on which the cell update message is sent supports enhanced uplink in CELL_FACH mode in response to identifying that the cell update message is initiated for the PS call; and
   removing the "Support of HS-DSCH DRX operation" IE, the "Support of common E-DCH" IE, the "Support of MAC-i/is" IE, the "HS-PDSCH in CELL_FACH" IE, the "Support of MAC-i/is" IE, the "Support of SPS operation" IE, and the "Support of Control Channel DRX operation" IE from the cell update message in response to determining that the network does not support enhanced uplink in CELL_FACH mode.

7. The method of claim 2, further comprising:
   identifying whether a packet switched (PS) or a circuit switched (CS) domain is inactive; and
   removing the "START value" IE for the domain identified as inactive.

8. The method of claim 2, further comprising:
   removing the "establishment cause" IE from the cell update message when the establishment cause IE is included in the cell update message.

9. The method of claim 2, further comprising:
   transitioning the UE to an idle mode.

10. The method of claim 1, wherein the threshold value is configured to 21 bytes.

11. An apparatus for dynamically configuring a cell update message at a user equipment (UE), comprising:

means for removing a "measured results on random access channel (RACH)" information element (IE) from a cell update message, wherein the "measured results on RACH" IE comprises cell measurement results for monitored cells other than a current cell, such that removing the "measured results on RACH" IE removes the measured results from the cell update message;

means for determining that a size of the cell update message at the UE is above a threshold value after removing the "measured results on RACH" IE from the cell update message; and means for removing one or more IEs from the cell update message until the size of the cell update message is at or below the threshold value, wherein the removed IEs are discarded.

12. The apparatus of claim 11, wherein the means for removing is further configured to select one or more IEs to be removed from the cell update message from a list comprising a "Support for Two DRX schemes in URA_PCH and CELL_PCH" IE, a "High-Speed Physical Downlink Shared Channel (HS-PDSCH) in CELL_FACH" IE, a "Support of High Speed Downlink Shared Channel (HS-DSCH) DRX operation" IE, a "Support of common Enhanced uplink Dedicated Channel (E-DCH)" IE, a "Support of Media Access Control (MAC)-i/is" IE, a "Support of Semi-Persistent scheduling (SPS) operation" IE, a "Support of Control Channel discontinuous reception (DRX) operation" IE, a "HS-PDSCH in CELL_FACH" IE, a "START value" IE for an inactive domain, and an "establishment cause" IE.

13. The apparatus of claim 12, wherein the means for removing is further configured to:
identify whether a cell update procedure that triggers the cell update message is initiated due to a circuit switched (CS) call; and
remove the "HS-PDSCH in CELL_FACH" IE, the "Support of HS-DSCH DRX operation" IE, the "Support of common E-DCH" IE" IE, the "Support of MAC-i/is" IE, the "Support of SPS operation" IE, and the "Support of Control Channel DRX operation" IE from the cell update message in response to identifying that the cell update procedure that triggered the cell update message is initiated due to the CS call.

14. The apparatus of claim 12, wherein the means for removing is further configured to:
identify whether a cell update procedure that triggers the cell update message is initiated for a packet switched (PS) call;
determine whether a network on which the cell update message is sent supports HS-DSCH in CELL_FACH mode; and
remove the "Support of HS-DSCH DRX operation" IE, the "Support of common E-DCH" IE, the "Support of MAC-i/is" IE, the "Support of SPS operation" IE, the "Support of Control Channel DRX operation" IE from the cell update message in response to determining that the network does not support HS-DSCH in CELL_FACH mode.

15. The apparatus of claim 12, wherein the means for removing is further configured to:
identify whether a cell update procedure that triggers the cell update message is initiated for a packet switched (PS) call;
determine whether a network on which the cell update message is sent supports enhanced uplink in CELL_FACH; and
remove the "Support of HS-DSCH DRX operation" IE, the "Support of common E-DCH" IE, the "Support of MAC-i/is" IE, the "HS-PDSCH in CELL_FACH" IE, the "Support of MAC-i/is" IE, the "Support SPS operation" IE, and the "Support of Control Channel DRX operation" IE from the cell update message in response to determining that the network does not support enhanced uplink in CELL_FACH mode.

16. A non-transitory computer readable medium storing computer executable code for dynamically configuring a cell update message at a user equipment (UE), comprising:
code for removing a "measured results on random access channel (RACH)" information element (IE) from a cell update message, wherein the "measured results on RACH" IE comprises cell measurement results for monitored cells other than a current cell, such that removing the "measured results on RACH" IE removes the measured results from the cell update message;
code for determining that a size of the cell update message at the UE is above a threshold value after removing the "measured results on RACH" from the cell update message; and
code for removing one or more IEs from the cell update message until the size of the cell update message is at or below the threshold value, wherein the removed IEs are discarded.

17. The computer readable medium of claim 16, wherein the code for removing further comprises code for selecting IEs from a list comprising a "Support for Two DRX schemes in URA_PCH and CELL_PCH" IE, a "High-Speed Physical Downlink Shared Channel (HS-PDSCH) in CELL_FACH" IE, a "Support of High Speed Downlink Shared Channel (HS-DSCH) DRX operation" IE, a "Support of common Enhanced uplink Dedicated Channel (E-DCH)" IE, a "Support of Media Access Control (MAC)-i/is" IE, a "Support of Semi-Persistent scheduling (SPS) operation" IE, a "Support of Control Channel discontinuous reception (DRX) operation" IE, a "HS-PDSCH in CELL_FACH" IE, a "START value" IE for an inactive domain, and an "establishment cause" IE.

18. The computer readable medium of claim 17, wherein the code for removing further comprises:
code for identifying whether a packet switched (PS) or a circuit switched (CS) domain is inactive; and
code for removing the "START value" IE for the domain identified as inactive.

19. The computer readable medium of claim 17, wherein the code for removing further comprises code for removing the "establishment cause" IE from the cell update message when the establishment cause is included in the cell update message.

20. The computer readable medium of claim 16, wherein the threshold value is configured to 21 bytes.

21. An apparatus for dynamically configuring a cell update message at a user equipment (UE), comprising:
an information element (IE) removal component configured to remove a "measured results on random access channel (RACH)" IE from a cell update message, wherein the "measured results on RACH" IE comprises cell measurement results for monitored cells other than a current cell, such that removing the "measured results on RACH" IE removes the measured results from the cell update message;
a cell update message size determining component configured to determine that a size of the cell update message at the UE is above a threshold value after "measured results on random access channel (RACH)" is removed from the cell update message; and the IE removal component further configured to remove one or more IEs from the cell update message until the size of the cell update message is at or below the threshold value,
wherein the removed IEs are discarded.

22. The apparatus of claim 21, wherein the IE removal component is further configured to select the one or more additional IEs removed from the cell update message from a list comprising a "Support for Two DRX schemes in URA_PCH and CELL_PCH" IE, a "High-Speed Physical Downlink Shared Channel (HS-PDSCH) in CELL_FACH" IE, a "Support of High Speed Downlink Shared Channel (HS-DSCH) DRX operation" IE, a "Support of common Enhanced uplink Dedicated Channel (E-DCH)" IE, a "Support of Media Access Control (MAC)-i/is" IE, a "Support of Semi-Persistent scheduling (SPS) operation" IE, a "Support of Control Channel discontinuous reception (DRX) operation" IE, a "HS-PDSCH in CELL_FACH" IE, a "START value" IE for an inactive domain, and an "establishment cause" IE.

23. The apparatus of claim 22, wherein the IE removal component is further configured to remove the "Support for Two DRX schemes in URA_PCH and CELL_PCH" IE from the cell update message.

24. The apparatus of claim 22, further comprising:
a call type determining component configured to identify whether a cell update procedure that triggers the cell update message is initiated due a circuit switched (CS) call; and
the IE removal component further configured to remove the "HS-PDSCH in CELL_FACH" IE, the "Support of HS-DSCH DRX operation" IE, the "Support of common E-DCH" IE, the "Support of MAC-i/is" IE, the "Support of SPS operation" IE, and the "Support of Control Channel DRX operation" IE from the cell update message in response to identifying that the cell update procedure that triggered the cell update message is initiated due to the CS call.

25. The apparatus of claim 22, further comprising:
a call type determining component configured to identify whether a cell update procedure that triggers the cell update message is initiated for a packet switched (PS) call;
the call type determining component further configured to determine whether a network on which the cell update message is sent supports HS-DSCH in CELL_FACH mode; and the IE removal component further configured to remove the "Support of HS-DSCH DRX operation" IE, the "Support of common E-DCH" IE, the "Support of MAC-i/is" IE, the "Support of SPS operation" IE, the "Support of Control Channel DRX operation" IE from the cell update message in response to determining that the network does not support HS-DSCH in CELL_FACH mode.

26. The apparatus of claim 22, further comprising:
a call type determining component configured to identify whether a cell update procedure that triggers the cell update message is initiated for a packet switched (PS) call;
the call type determining component further configured to determine whether a network on which the cell update message is sent supports enhanced uplink in CELL_FACH mode; and
the IE removal component further configured to remove the "Support of HS-DSCH DRX operation" IE, the "Support of common E-DCH" IE, the "Support of MAC-i/is" IE, the "HS-PDSCH in CELL_FACH" IE, the "Support of MAC-i/is" IE, the "Support of SPS operation" IE, and the "Support of Control Channel DRX operation" IE from the cell update message in response to determining that the network does not support enhanced uplink in CELL_FACH mode.

27. The apparatus of claim 22, further comprising:
a domain status determining component configured to identify whether a packet switched (PS) or a circuit switched (CS) domain is inactive; and
the IE removal component further configured to remove the "START value" IE for the domain identified as inactive.

28. The apparatus of claim 22, wherein the IE removal component is further configured to remove the "establishment cause" IE from the cell update message when the establishment cause is included in the cell update message.

29. The apparatus of claim 22, further comprising:
a cell update message configuration manager configured to transition the UE to an idle mode.

30. The apparatus of claim 21, wherein the threshold value is configured to 21 bytes.

* * * * *